(12) United States Patent
Inoue et al.

(10) Patent No.: US 7,603,594 B2
(45) Date of Patent: Oct. 13, 2009

(54) WIRELESS COMMUNICATIONS SYSTEM

(75) Inventors: Masugi Inoue, Tokyo (JP); Mikio Hasegawa, Tokyo (JP); Khaled Mahmud, Tokyo (JP); Homare Murakami, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 485 days.

(21) Appl. No.: 10/579,737

(22) PCT Filed: Nov. 19, 2003

(86) PCT No.: PCT/JP03/14723

§ 371 (c)(1),
(2), (4) Date: Dec. 6, 2006

(87) PCT Pub. No.: WO2005/051029

PCT Pub. Date: Jun. 2, 2005

(65) Prior Publication Data

US 2007/0146475 A1    Jun. 28, 2007

(51) Int. Cl.
*G01R 31/28* (2006.01)
*H04J 3/26* (2006.01)
*H04W 4/00* (2009.01)

(52) U.S. Cl. .................................... 714/712; 370/432
(58) Field of Classification Search ............... 714/712; 370/328, 432; 455/435.2
See application file for complete search history.

(56) References Cited

U.S. PATENT DOCUMENTS

| | | | |
|---|---|---|---|
| 6,954,442 B2 * | 10/2005 | Tsirtsis et al. ............... | 370/328 |
| 7,512,093 B2 * | 3/2009 | Nakatsugawa et al. ...... | 370/328 |
| 2001/0029191 A1 | 10/2001 | Wilhelm | |
| 2002/0173303 A1 | 11/2002 | Shibutani | |
| 2003/0157936 A1 * | 8/2003 | Ohtani et al. ............... | 455/436 |
| 2004/0023652 A1 * | 2/2004 | Shah et al. ............... | 455/426.2 |
| 2005/0154774 A1 * | 7/2005 | Giaffreda et al. ........... | 709/200 |
| 2005/0239443 A1 | 10/2005 | Watanabe et al. | |

FOREIGN PATENT DOCUMENTS

| | | |
|---|---|---|
| JP | 2002-223467 A | 8/2002 |
| JP | 2003-514442 A | 4/2003 |
| JP | 2003-309879 A | 10/2003 |
| WO | WO-01/35585 A1 | 5/2001 |
| WO | WO-03/075489 A | 9/2003 |

OTHER PUBLICATIONS

Zundt, M. et al., "Seamless Handoff in Community Based and Location Aware Heterogeneous Wireless Networks", International Workshop on Mobile Multimedia Conference (MoMuC) 2003, pp. 1-5. XP 002281321.

* cited by examiner

*Primary Examiner*—Phung M Chung
(74) *Attorney, Agent, or Firm*—Birch, Stewart, Kolasch & Birch, LLP

(57) ABSTRACT

The present invention is a wireless communications system for simultaneously establishing a basic access network and a wireless access network using at least two kinds of wireless communication networks. In the basic access network, there are executed signaling communication for obtaining available network information based on the position information of a terminal and communication by SIP (Session Initiation Protocol) for executing exchange of a subscribe request signal between terminals and negotiation of communication. This arrangement makes it possible to connect between terminals by a media application on peer to peer.

6 Claims, 16 Drawing Sheets

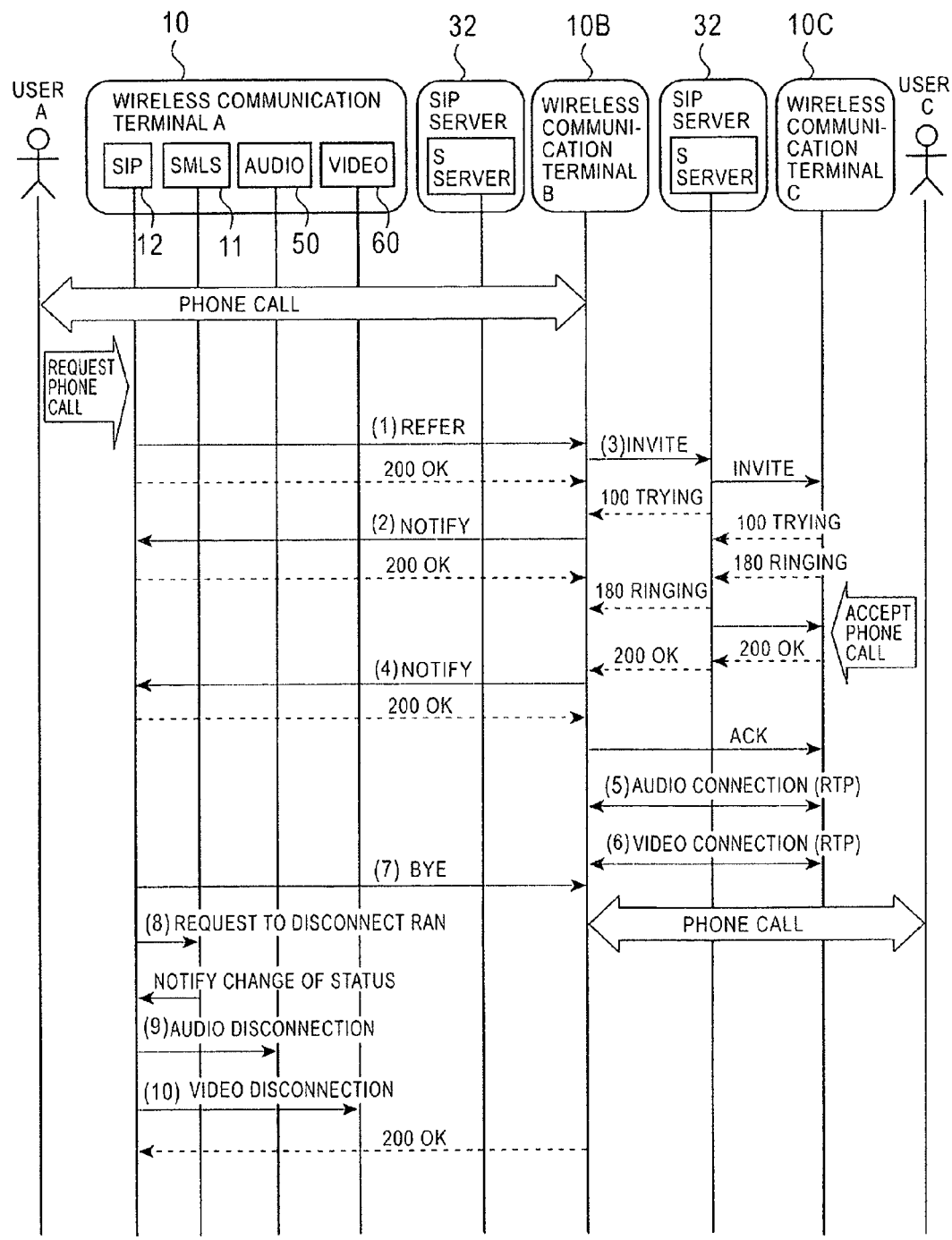

WIRELESS COMMUNICATIONS SYSTEM

TECHNICAL FIELD

The present invention relates to a technology for continuously switching different wireless communication networks when data communications is executed using at least two types of wireless communication networks. In particular, the present invention relates to a technology for executing audio or video communication between two wireless communication terminals.

BACKGROUND ART

Various types of wireless communication networks, which have been in practical use nowadays such as customer-owned systems, for example, wireless LAN, Bluetooth, and the like and public network systems, for example, mobile phone, PHS, and the like function independently of each other at present, and users selectingly use them according to applications, areas, communication speeds, and the like.

Since these wireless communication networks have various communications speeds, service areas, communication costs, and the like depending on the types thereof, it is necessary to appropriately switch the networks depending on a location where they are connected in place of using a particular network at all times.

At the time, it is required a seamless handover technology that integratingly handles the respective systems, selects an appropriate network and switches a network being used to it without causing a user to be aware of the switching, and executes communication continuously without interrupting it.

As the method described above, it is contemplated to separate a network, through which communication is executed to control switching of network and the like, from a network through which data communications is executed. It is known a method of establishing data communications and audio communication also in a wireless communications system that does not have a paging function originally by using a wide area wireless communications system as disclosed in, for example, PCT application (CRT-PCT06) proposed by the applicants. According to the technology, it is proposed to use a wide area wireless communications system having a paging function of, for example, a pager line and the like as an exclusive system for paging as well as to use, for example, wireless LAN and the like as the wireless communications system and to utilize them by combining the characteristics of them, respectively.

The method intends to effectively utilize existing infrastructures, in particular, the pager line and the like. However, since a whole system is constructed by previously determining a particular network as a control network, a problem arises in that the system does not function in locations, for example, an oversea area, an isolated island, and the like where the control network cannot be used.

Further, even when a plurality of networks can be used for data communications, the data communications cannot be executed while continuously switching the networks. In particular, when communication is switched between wireless communication networks to which base stations are connected at positions different in network, a technology for not only switching a terminal wireless system promptly but also properly switching a data transmission path on a network side is necessary, and it is desired to realize the technology.

In particular, when a data communications and a video data communications are executed between wireless communication terminals on peer to peer, a technology for continuously changing the communications between the terminals according to an available band.

DISCLOSURE OF THE INVENTION

The present invention, which was created in view of the above background, realizes continuous switching of communications using a wireless communication network for control and data communications networks other than the network for control. Further, a control network is arranged such that an optimum network can be selected to realize a highly flexible network connection environment.

An invention according to claim 1 is a wireless communications system which uses at least two kinds of wireless communication networks, enables to simultaneously connect to a basic access network for executing signaling communication in which communication is controlled so as to be continuously switched and to a wireless access network for executing data communications other than the signaling communication and includes wireless communication terminals and a wireless communication server.

each of the wireless communication terminals includes a seamless application processing unit for executing connection processing to the basic access network and connection/disconnection processing to and from the wireless access network, an audio application processing unit for transmitting and receiving audio data though the wireless access network, a video application processing unit for transmitting and receiving video data through the wireless access network, a client processing unit having a client function in the signaling communication for controlling the audio application and the video application, a multicast communication node application processing unit for setting multicast reception using at least the two kinds of the wireless communication networks, respective network devices corresponding to the respective wireless communication networks, and position obtaining means of the wireless communication terminals.

In contrast, the wireless communication server includes a home agent application processing unit for setting a multicast transmission using at least the two kinds of the wireless communication networks, a basic access network server processing unit for notifying, when the wireless communication networks are continuously switched, the wireless communication terminals of a wireless communication network acting as a switching candidate, for managing the signaling communication for communicating the status of the respective wireless communication terminals therebetween, and for managing the registration/update processing of the respective wireless communication terminals, a relay server processing unit for managing relay of the signaling communication for communicating the status of the respective wireless communication terminals therebetween, a terminal status table for managing the status of the respective wireless communication terminals, and a terminal configuration table for managing the wireless communication network interfaces implemented in the wireless communication terminals.

Then, the seamless application processing unit is characterized in that obtains position information from the position obtaining means and notifies the basic access network server processing unit of the position information, and the basic access network server processing unit registers the position information to the terminal status table.

An invention according to claim 2 is such that the seamless application processing unit monitors the connection status of the respective wireless communication networks at a predetermined cycle based on a list of the wireless communication networks previously recorded to the wireless communication terminals.

According to an invention of claim 3, the wireless communication server is composed of two servers, that is, a home agent server including the home agent application processing unit and a resource server including the basic access network server processing unit, the basic access network server processing unit, the relay server processing unit, the terminal status table, and the terminal configuration table. Further, the home agent server is provided with a proxy server processing unit for relaying communication between the seamless application processing unit and the basic access network server processing unit.

According to an invention of claim 4, it is provided a wireless communications system wherein in the relay server processing unit, the wireless communication terminals are registered to the relay server processing unit together with the position information thereof, and each of respective client processing units transmits a subscribe request signal to an opponent client processing unit between and two optional registered wireless communication terminals and the client processing unit, which receives the subscribe request signal, directly responds its information to an opponent and establishes connection between the wireless communication terminals.

According an invention of claim 5, the audio application processing unit and the video application processing unit establish direct connection to the audio application processing unit and the video application processing unit of the opponent wireless communication terminal.

According to an invention of claim 6, communication between audio application processing units is continuously switched to communication between video application processing units by signaling communication between respective client processing units in response to the status change notification from the seamless application processing unit of the wireless communication terminal.

BRIEF DESCRIPTION OF DRAWINGS

FIG. 16 shows a sequence of a phone call transfer function.

Figure 1:
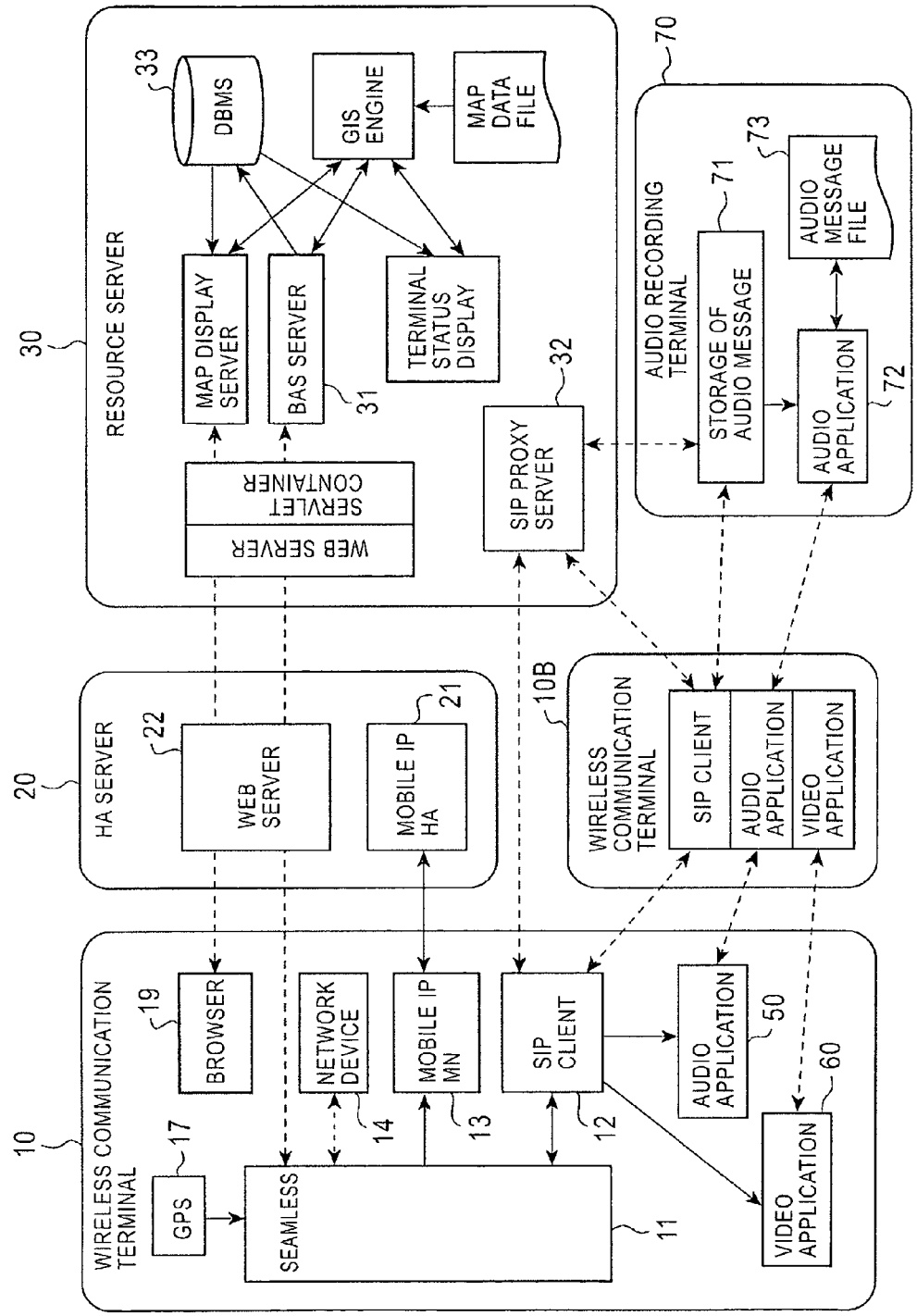
FIG. 1 is a whole configurational view of a wireless communications system according to the present invention.

Portions denoted by reference numerals are as shown below. 10: wireless communication terminal, 11: seamless application processing unit, 12: SIP client processing unit, 13: Mobile IP mobile node processing unit, 20: home agent server, 21: Mobile IP home agent processing unit, 30: resource server, 31: BAS server, 32: SIP proxy server, 50: audio application processing unit, 60: video application processing unit, 70: audio recording terminal

BEST MODE FOR CARRYING OUT THE INVENTION

A method of embodying the present invention will be explained based on an embodiment shown in the figures. Note that the embodiment of the present invention is not limited to the one described below and may be appropriately modified.

FIG. 1 is a whole configurational view of a wireless communications system according to the present invention. The system is composed of a wireless communication terminal (10) that can be carried by a user, a home agent server (20), and a resource server (30). The home agent server (20) is connected to the resource server (30) through a wired or wireless communication network. In addition to the above arrangement, a single wireless communication network may be arranged by integrating both the servers (20) and (30).

The wireless communication terminal (10) realizes mobility as a mobile node of Mobile IPv4 and continuously switches wireless communication networks by automatic control.

The terminal (10) is composed of, for example, a known personal computer and a PDA (Personal Digital Assistant) and includes a seamless application processing unit (11), a client processing unit (hereinafter, called SIP client processing unit) (12), a Mobile IP mobile node processing application unit (13) as a multicast communication node application processing unit, and a network device (14) corresponding to the wireless communication network as shown in the figure.

In addition to the above processing units, the wireless communication terminal (10) includes an audio application processing unit (50) that transmits and receives audio data through a wireless access network which is a feature of the invention and inputs and outputs it to and from a not shown audio input/output device, a video application processing unit (60) that transmits and receives video data through the wireless access network likewise and inputs and outputs it to and from a not shown video input/output device, and a browser processing unit (19) for displaying information to a user. A method of implementing them on a computer and manipulating them is known. Further, the wireless communication terminal (10) includes a GPS receiver (17) as a position obtaining means for detecting the position of the terminal.

The terminal (10) stores a location table used in the seamless application processing unit (11) and a BAS setting file (16) used in the SIP client processing unit (12) in a memory or an external storage unit in the terminal (10).

The Mobile IP mobile node application processing unit (13) of the present invention supports Simultaneous bindings of Mobile IP. After the Mobile IP mobile node processing unit (13) executes Registration by Simultaneous bindings, it receives the same packets sent from the home agent server (20) and disables one of them.

Figure 2:
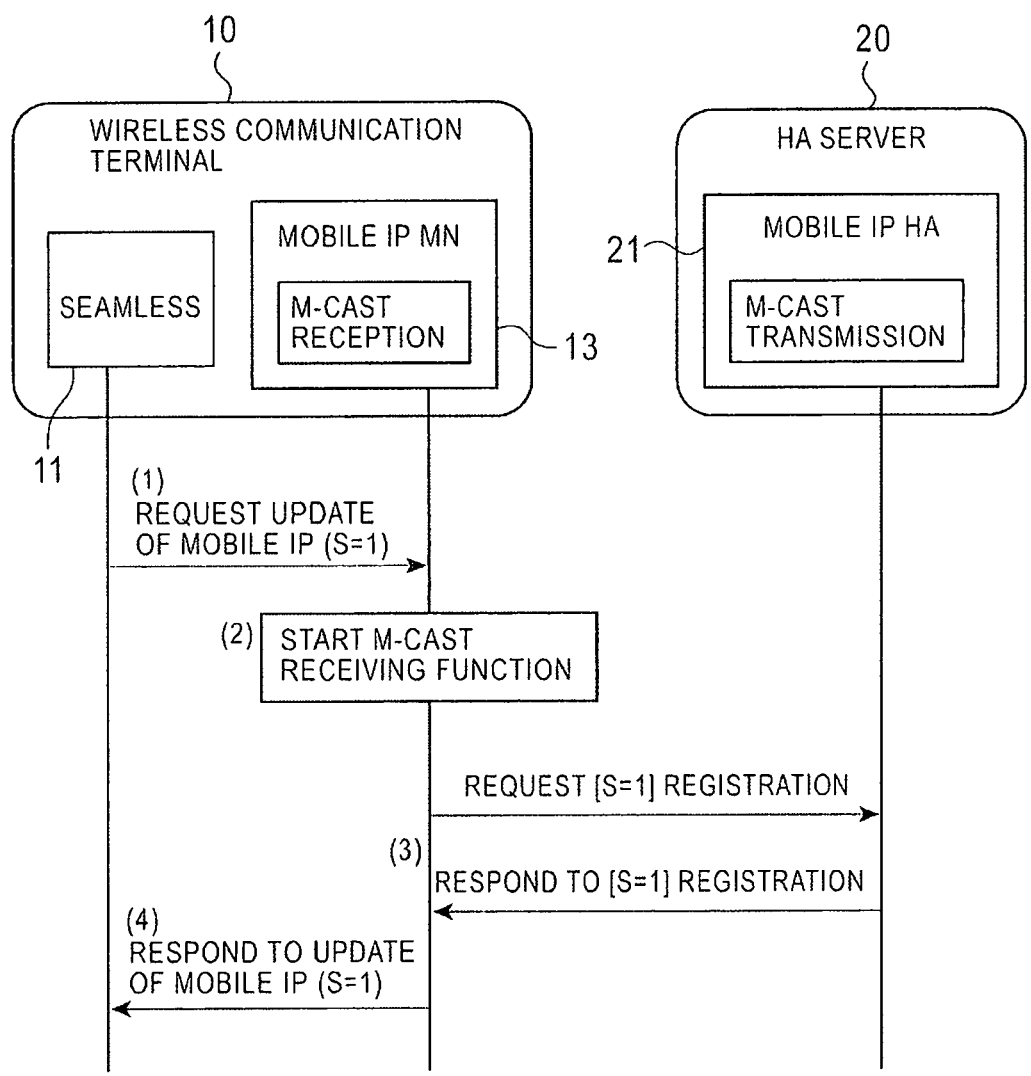
FIG. 2 shows a sequence for setting M-cast reception.

The Mobile IP mobile node processing unit (13) provides a function for setting and canceling multicast (M-cast) reception. FIG. 2 shows a sequence for setting M-cast reception.

Reception is set in response to an instruction for setting M-cast reception from the seamless application processing unit (11) that will be described later, and Registration Update is requested to a Mobile IP home agent processing unit (21) as a home agent application processing unit of the home agent server (20). At the time, parameter S=1 is sent in Registration Update.

A response to Registration Update (S=1) is returned from the Mobile IP home agent processing unit (21), and a response of Mobile IP Update is further notified to the seamless application processing unit (11) from the Mobile IP mobile node application processing unit (13). Note that when no response is returned from the home agent server (20), registration update is requested again, and when no response is returned for a predetermined period of time, the processing is finished by the seamless application processing unit (11).

Figure 3:
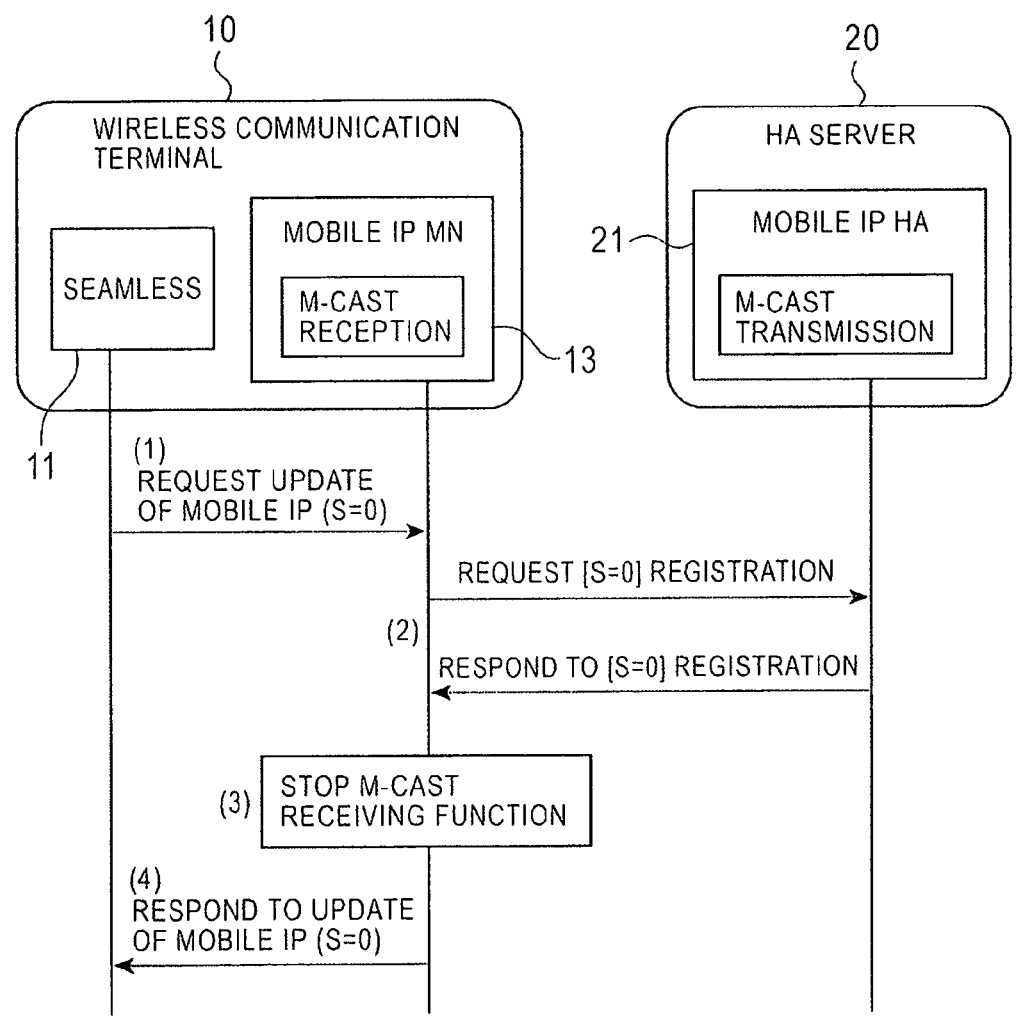
FIG. 3 shows a sequence for canceling the M-cast reception when multicast is finished.

In contrast, when the multicast is finished, the M-cast reception is canceled. FIG. 3 shows a sequence at the time. Although the same sequence is also employed when the M-cast reception is canceled, Registration Update processing is executed by setting the parameter to S=0. Incidentally, when no response is returned from the home agent server (20), an M-cast status is continued.

Figure 4:
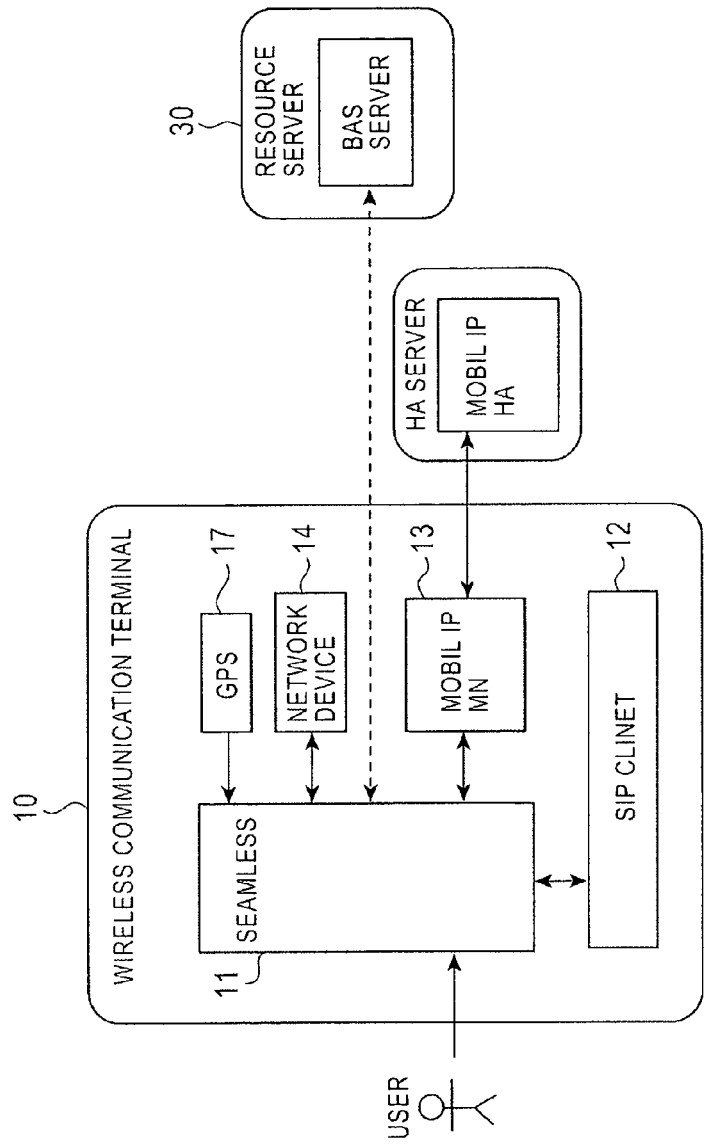
FIG. 4 is an explanatory view of a seamless application processing unit.

Next, processing executed by the seamless application processing unit (11) will be explained. FIG. 4 shows an explanatory view of the processing unit including protocol to be used.

When the seamless processing unit (11) starts up, it executes connection to a basic access network (BAN) and a wireless access network (RAN). In the present invention, BAN executes signaling communication (BAS: Basic Access Signaling) for obtaining available network information based on the position information of terminal to realize continuous switching of communication and executes communication by SIP (Session Initiation Protocol) that executes exchange of SUBSCRIBE request signal (presence) between terminals and negotiation of communication. BAS employs HTTP. Other data communications are executed by Mobile IP by being connected to a wireless access network (RAN).

Further, as one of the features of the present invention, it is possible to monitor the communication status of a communication device used as RAN and to switch the device automatically and continuously when an abnormal communication is detected. Further, the device may be also manually switched when the user selects to do so. When communication is finished in RAN, RAN is automatically disconnected and a power supply of the device is also turned off.

The seamless application processing unit (11) includes a communication device scan function for determining whether it is possible or not to connect the network device (14) being connected, a communication device connection function for automatically connecting the device after the power supply of the device is turned on, a communication device monitor function for detecting link down of the device, and a communication device disconnection function for turning off the power supply after the device is automatically disconnected.

Further, as to RAN and BAN, the seamless application processing unit (11) also includes respective functions of a RAN connection function for setting RAN after start up, a RAN switch function for switching to next candidate RAN in response to detection of the link down and a switch instruction from the user or from the SIP client processing unit (12), and a BAN connection function for setting the network of a communication device used as BAN at present at start up.

The communication device scan function includes processing for obtaining electric wave intensity of a predetermined cycle from the network device (14) which is registered to a not shown location table by the seamless application processing unit (11), and the cycle is previously set by the user. A method of obtaining the electric wave intensity depends on respective devices, and methods disclosed by manufacturers of hardware may be also used. When the electric wave intensity is obtained, it is determined by the seamless application processing unit (11) that when the electric wave intensity is equal to or larger than a threshold value, connection is possible and when it is less than the threshold value, connection is impossible.

The communication device scan function is executed also to an unconnected wireless communication network at all times and turns on and off a power supply of a device as necessary.

The communication device connection function is a function for turning on power supplies when respective devices are used and dial-up connection is executed after the power supplies are turned on in a dial-up device such as a modem and the like of mobile phone and PHS. Further, in wireless LAN and the like, the communication device connection function sets the network of a device after the power supply is turned on. Incidentally, a dial up setting file to respective providers is previously stored in a location table and the like. Further, allocation of IP to respective networks (including DHCP), ESSID to the access points of wireless LAN, and passwords are previously set by the user and stored.

The communication device monitor function periodically monitors the link status of a device used for communication based on a value set to the location table. That is, the communication device monitor function obtains a communication status from a device driver of the network device (14) and, when the communication status is abnormal, the function executes RAN switch processing. Further, in the wireless LAN, when signal intensity is equal to or less than a threshold value, link down is detected. Otherwise, the link down may be detected by a known method other than the above method.

The communication device disconnection function is a function for setting an unused device ineffective and turning off a power supply of the network device (14). In the dial-up connection, a dial is disconnected.

Next, RAN/BAN connection according to the present invention will be explained.

Figure 5:
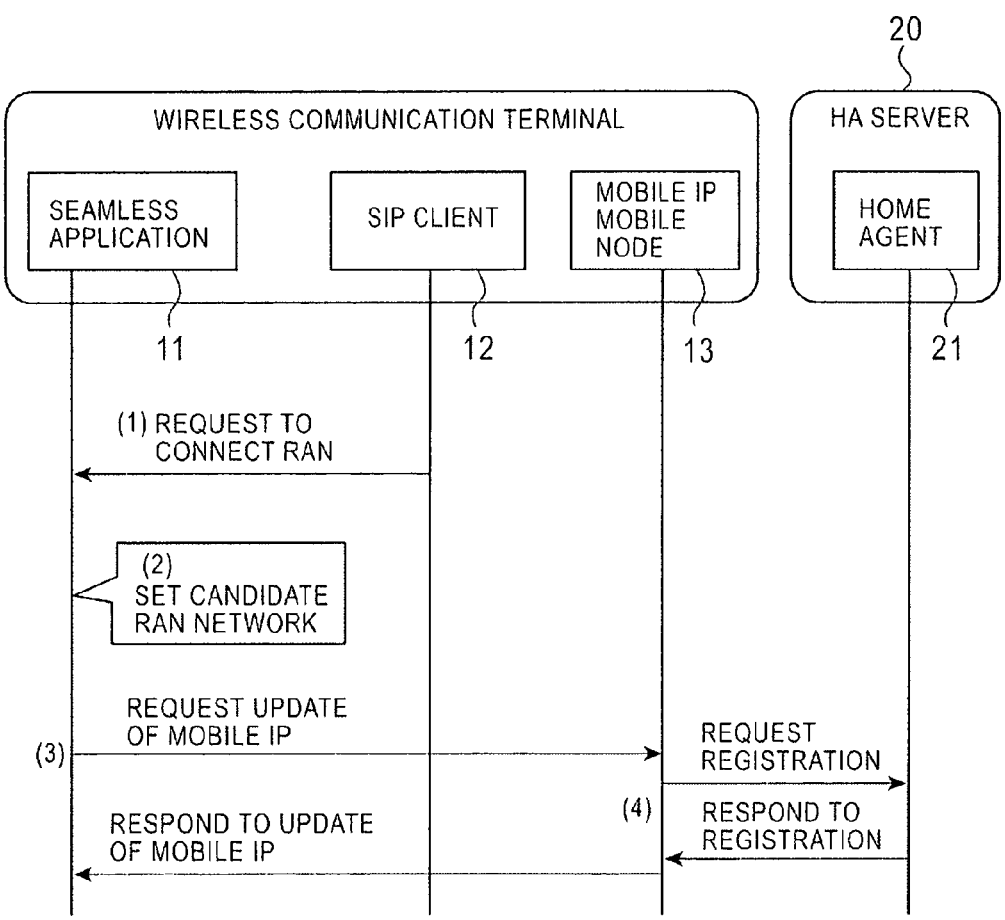
FIG. 5 shows a sequence for connecting RAN.

FIG. 5 shows a RAN connection sequence. When BAN is connected, a band, which is designated in response to a connection request from the SIP client processing unit (12), is filled, and the connection request is executed by obtaining an available candidate RAN having high priority from the location table. When no BAN is connected, the available candidate RAN having high priority is obtained from the location table and connected. Until the RAN is connected, it is tried to connect to a subsequent candidate RAN sequentially.

That is, when a seamless application starts up, a list of RAN switch candidates is obtained, and a candidate RAN is connected and a network is set. A Mobile IP update is requested to the Mobile IP mobile node (13) and registered. Then, information of connection as RAN is retained in the seamless application processing unit (11) as current RAN. The mobile node (11) requests Registration to the Mobile IP home agent processing unit (21) of the home agent server (20) by Dynamics function.

Note that when there is no RAN candidate in the seamless setting file (15), connection of RAN is executed again after a predetermined period of suspension.

Figure 6:
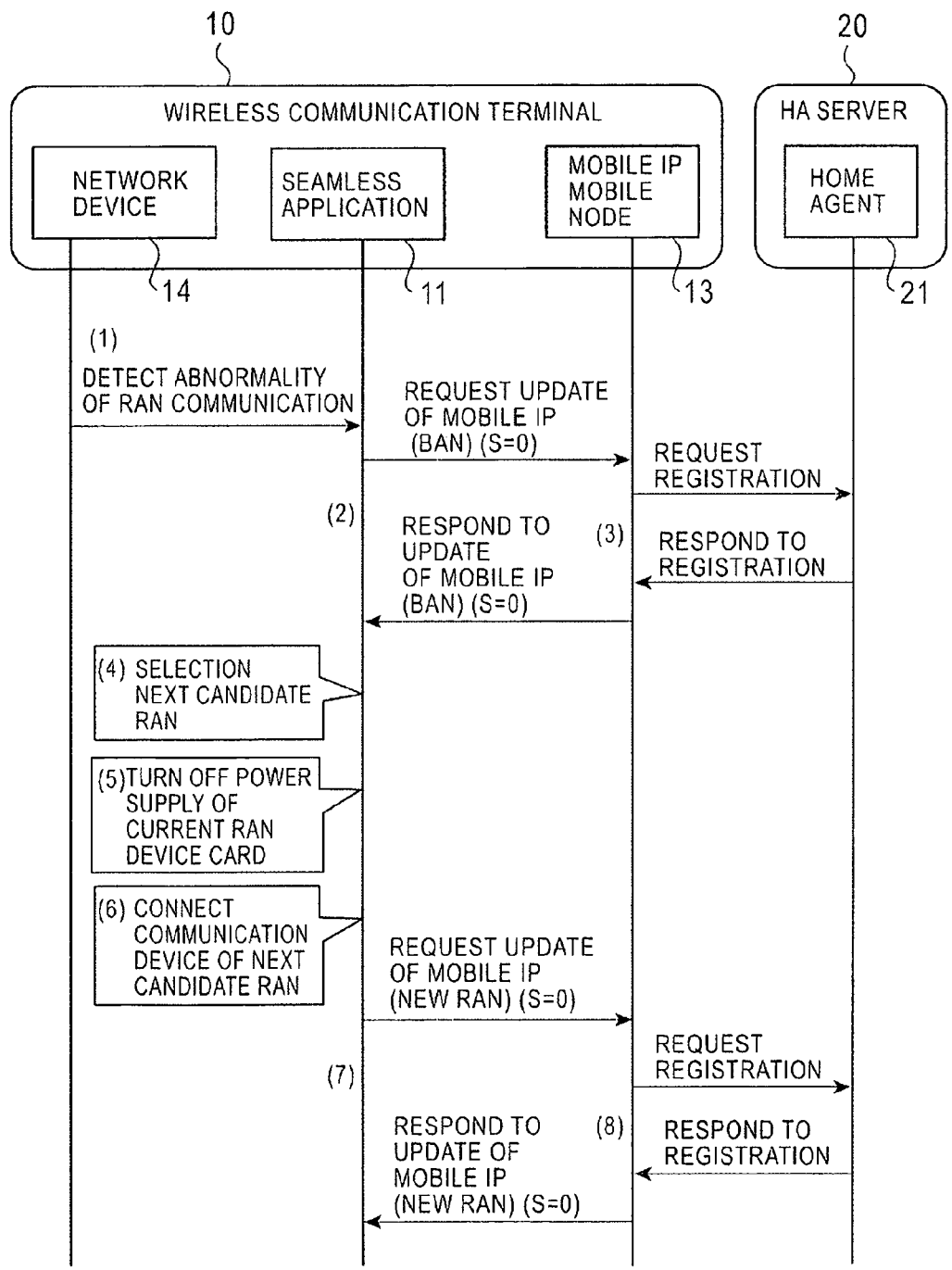
FIG. 6 shows a sequence for continuously switching RAN to next candidate RAN.

The present invention is characterized in that a plurality of access network RANs are switched as needed in response to an instruction from the user and according to the status of the network. FIG. 6 is shows a sequence for continuously switching RAN to a next candidate RAN when abnormal communication is detected in RAN.

That is, an abnormal communication of the network device (14) is detected by the seamless application processing unit (11), the wireless access network is switched to the basic access network by requesting Mobile IP update. That is, when connection of BAN is established and BAN is different from RAN, Mobile IP update is requested by setting the parameter of S=0 that means novel update, and connection is switched only to BAN. No update is executed in other cases.

When Mobile IP Update is requested, the Mobile IP mobile node (13) requests Registration to the Mobile IP home agent processing unit (21) by Dynamic function. With this request, connection is switched to BAN once.

Further, the seamless application processing unit (11) obtains the information of a next candidate RAN from the location table, and when the next candidate is different from BAN, the seamless application processing unit (11) makes the network of the current RAN whose abnormality is detected ineffective and turns off the power supply of a device and tries to connect to a next candidate RAN. Then, the seamless application processing unit (11) requests Mobile IP Update (S=0) for the new RAN to the mobile node (13), and the mobile node (13) requests Registration to the Mobile IP home agent processing unit (21) by Dynamic function.

When the next candidate is the same as BAN, since BAN can be used as it is, it is sufficient only to execute disconnection processing of the current RAN.

Figure 7:
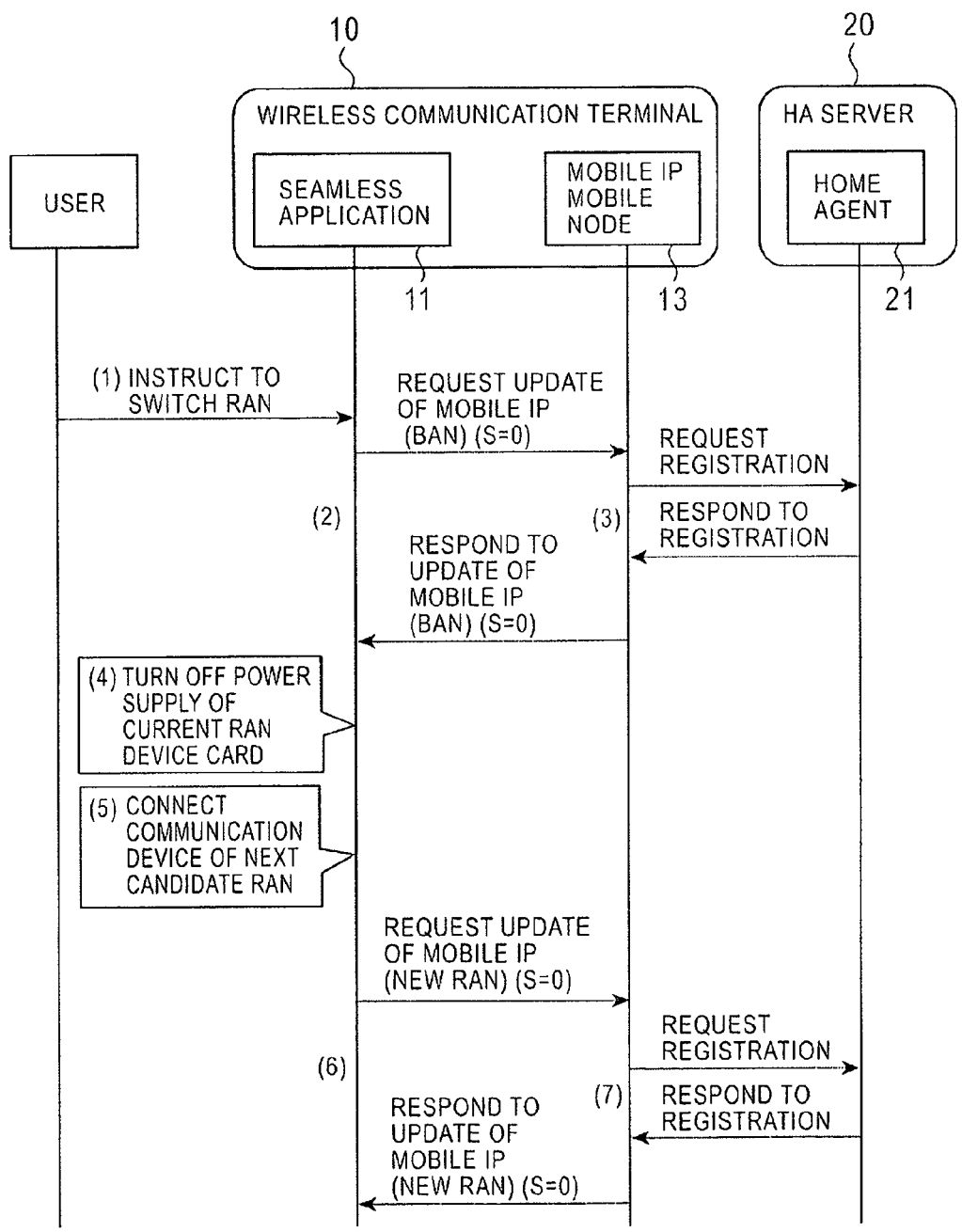
FIG. 7 shows a sequence when a user instructs to switch RAN.

FIG. 7 shows a sequence used when the user instructs to switch RAN. In this case, first, the user requests the seamless application processing unit (11) to obtain a list of selectable RAN candidates, and the seamless application processing unit (11) obtains the list of the RAN candidates from the location table. The seamless application processing unit (11) returns the list to the user, who selects RAN and instructs switching.

When connection of BAN is established and BAN is different from RAN, the seamless application processing unit (11) requests Mobile IP update using the parameter set to S=1 that means additional update to execute connection of BAN in multicast in addition to a current RAN. No update is executed in other cases.

When Mobile IP update is requested, the Mobile IP mobile node (13) requests Registration to the Mobile IP home agent processing unit (21) by Dynamic function. With this request, even if link down of RAN occurs in midstream, connection by BAN is maintained.

Further, the seamless application processing unit (11) executes the following processing based on the relation among the current RAN and the RAN designated by the user and BAN.

When BAN is the same as the current RAN, connection to the designated RAN and a request and registration of Mobile IP update (S=0) are executed while maintaining the network of the current RAN as it is.

When BAN is the same as the designated RAN, the current RAN is disconnected, and a request and registration of Mobile IP update (S=0) are executed.

When BAN is different from the current RAN and the designated RAN, the current RAN is disconnected, and a request and registration of Mobile IP update (S=0) of the designated RAN are executed.

Figure 8:
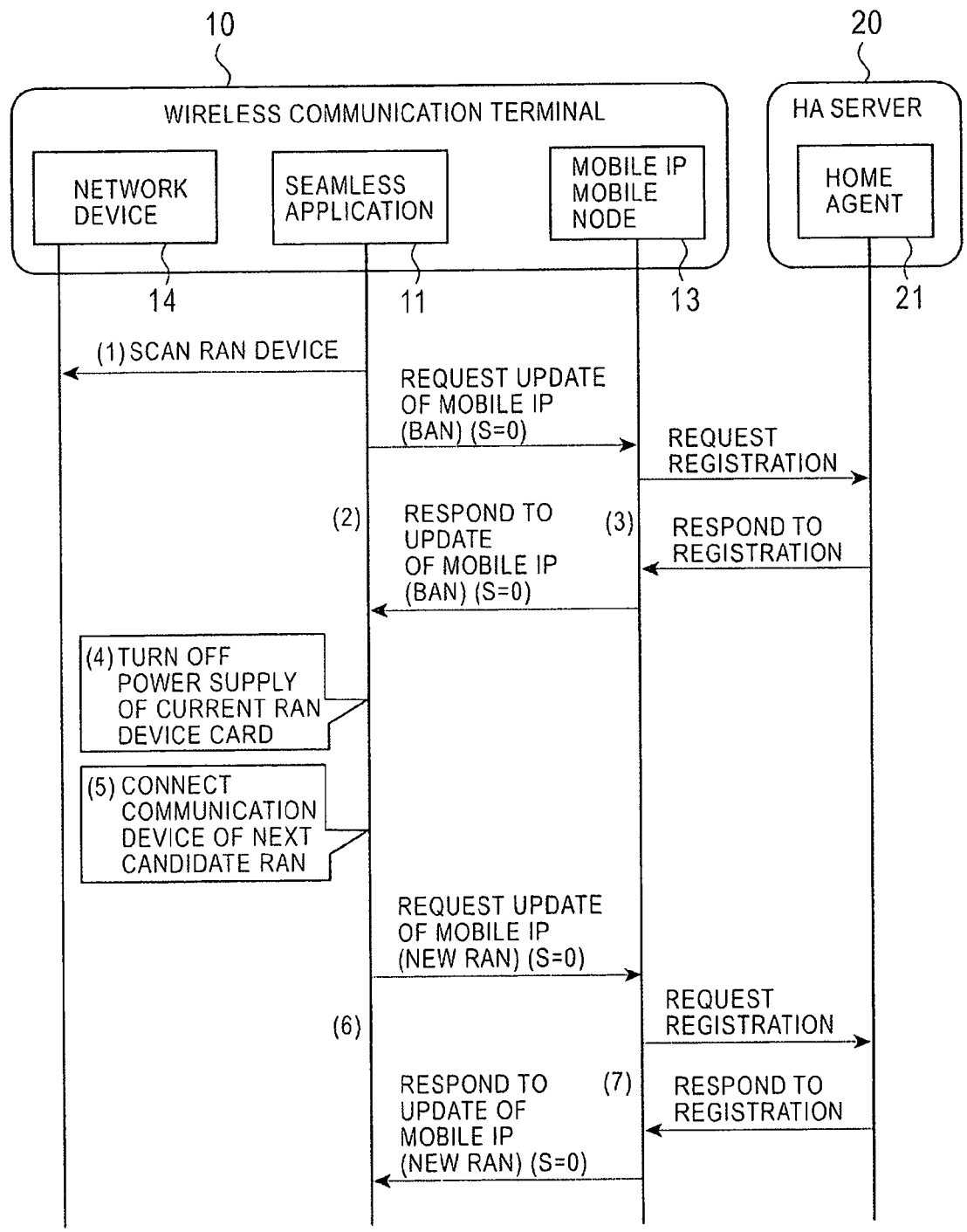
FIG. 8 shows a sequence of switching that is used when it is possible to return to RAN having higher priority.

Further, the present invention is provided with a sequence for monitoring whether or not it is possible to switch to RAN having higher priority and for returning to the RAN when it is possible to switch to it. This is shown in FIG. 8.

The seamless application processing unit (11) scans communication devices by the above function, and, as a result of the scan, the seamless application processing unit (11) detects that it is possible to connect RAN that satisfies a band in use and has priority higher than that of the current RAN (RAN having higher ranking of candidate).

When BAN is different from the current RAN, the seamless application processing unit (11) requests Mobile IP update using the parameter S=0 that means novel update, and switches connection only to BAN. No update is executed in other cases.

When Mobile IP update is requested, the mobile node (13) requests Registration to the Mobile IP home agent processing unit (21) by Dynamic function. With this request, connection is switched to BAN once.

Further, the seamless application processing unit (11) executes processing for switching to RAN having high priority by the same processing as that of the case in which an instruction is made from the user.

Next, the present invention also provides an arrangement for switching RAN in response to an instruction from the seamless application processing unit (11) connected to the basic access network server processing unit (hereinafter, also called BAS server) (31) disposed to the resource server (30) through the basic access network.

Figure 9:
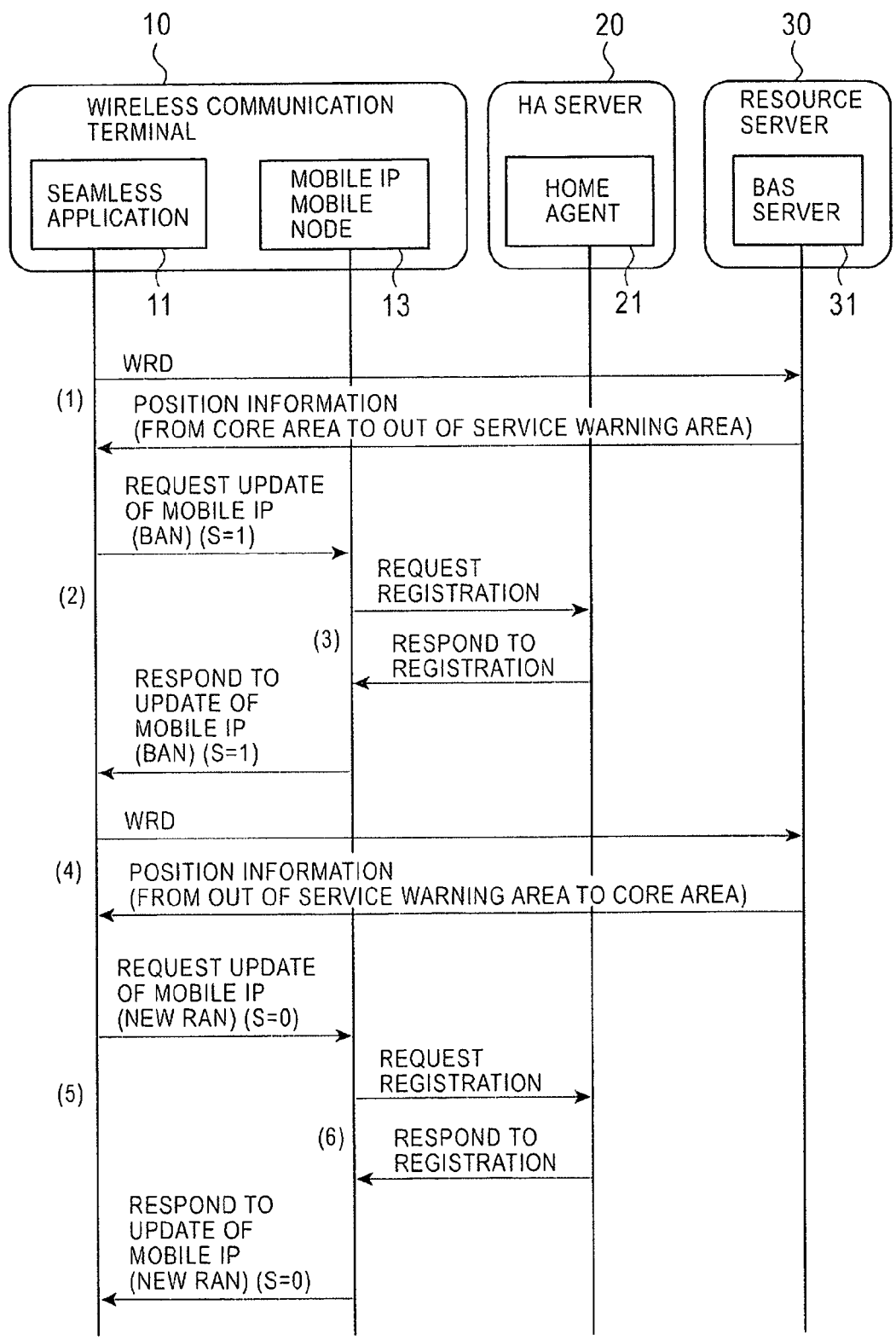
FIG. 9 shows a sequence for switching RAN in response to an instruction the seamless application processing unit (from out of service warning to core area).

That is, as shown in FIG. 9, when the seamless application processing unit (11) receives a notification from the BAS server (31) that the wireless communication terminal (10) enters an out of service warning area from a core area, provided that the current RAN is different from BAN, the seamless application processing unit (11) requests Mobile IP update of S=1 to the network of BAN. The mobile node (13) requests Registration to the Mobile IP home agent processing unit (21) by Dynamics function. With this request, connection to BAN is added.

Then, when it is notified from the BAS server (31) that the wireless communication terminal (10) returns to the core area again, the seamless application processing unit (11) requests Mobile IP update to the current RAN by S=0.

Figure 10:
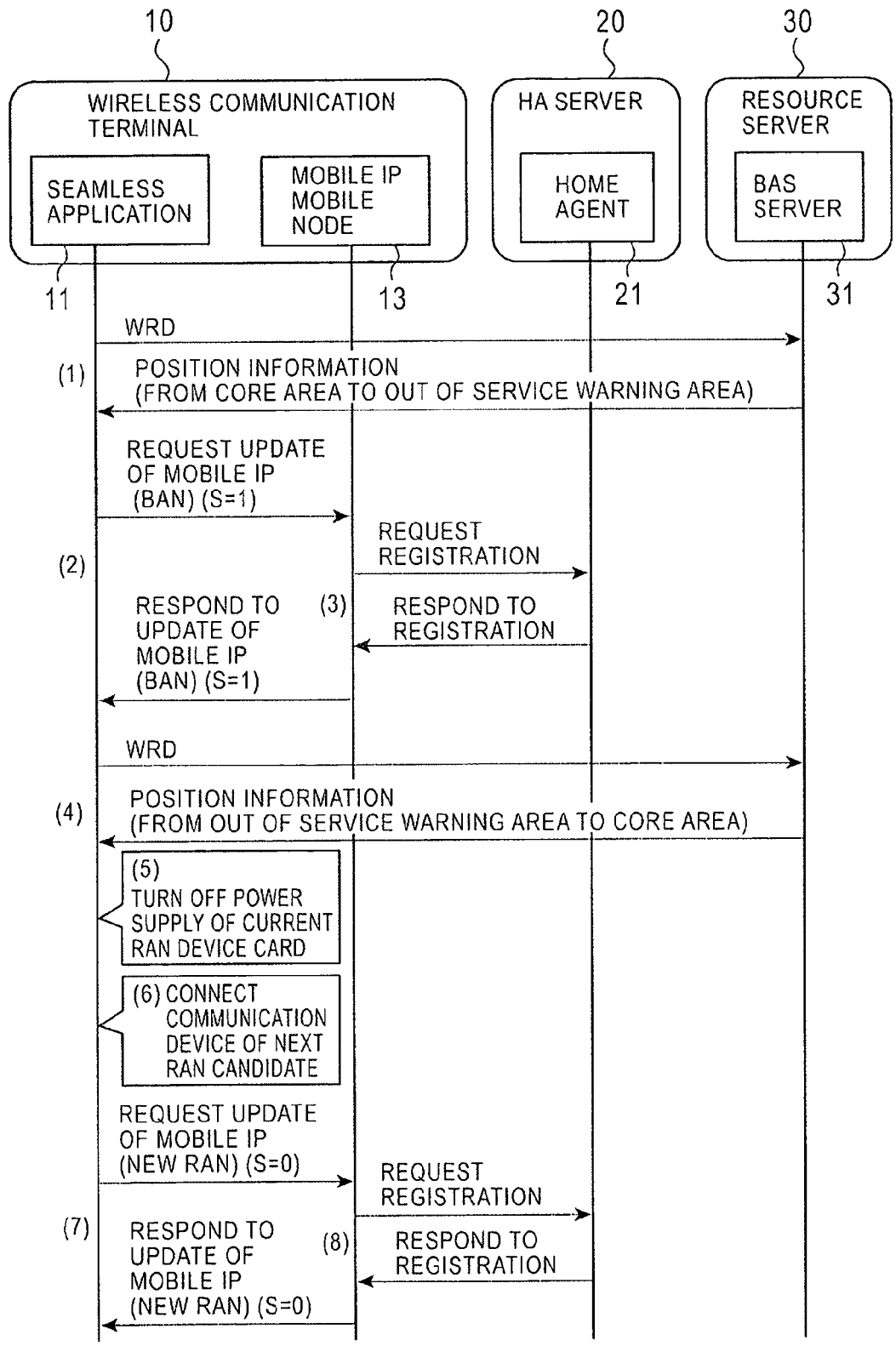
FIG. 10 shows a sequence for switching RAN in response to an instruction seamless application processing unit (from out of service warning to out of service).

In contrast, when the seamless application processing unit (11) obtains a notification from the SIP client processing unit (12) that the wireless communication terminal (10) goes to the out of service area without returning to the core area, the seamless application processing unit (11) obtains the RAN information of a next candidate from the location table and executes disconnection processing of the current RAN and executes connection processing of a next candidate RAN as shown in the sequence of FIG. 10.

In the present invention, since RAN and BAN can be optionally switched, BAN can be switched likewise RAN described above. However, when the seamless application processing unit (11) starts up, first, the information of a BAN switch candidate is obtained from the location table, and a network is set such that the BAN switch candidate can be used as BAN. When the BAN candidate cannot be connected as BAN, a next BAN switch candidate is obtained again and a network is set.

Figure 11:
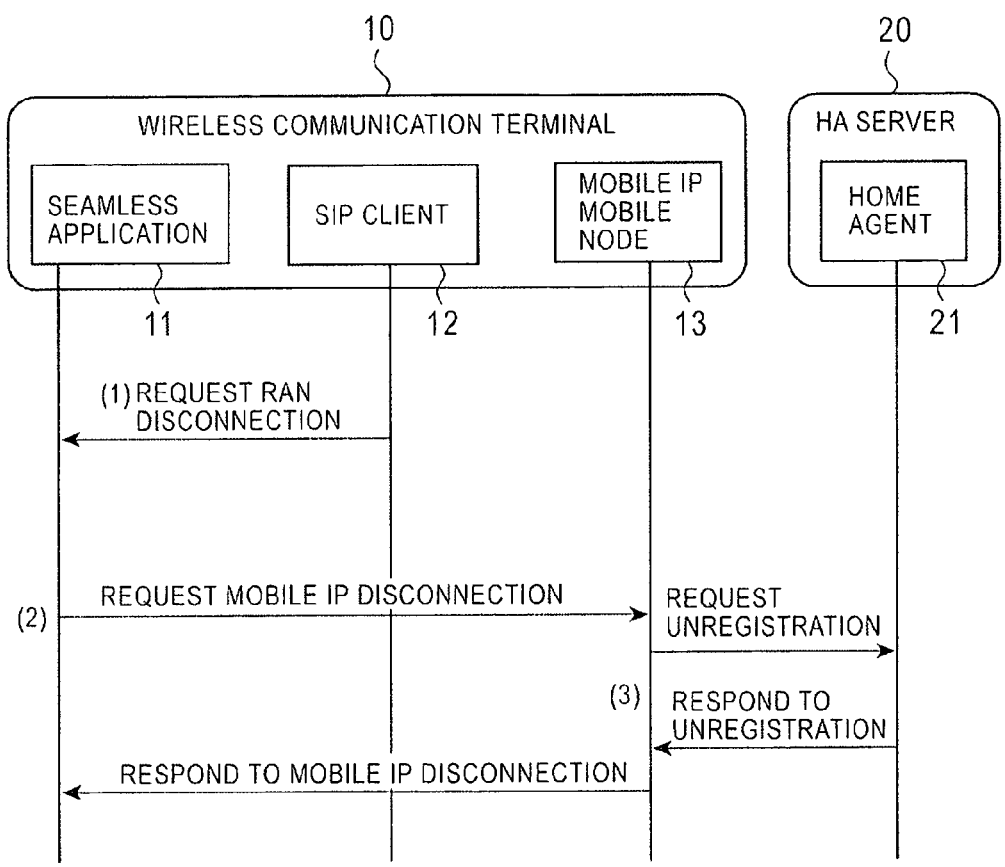
FIG. 11 shows a sequence of RAN disconnection function.

Further, a RAN disconnection function will be explained. As shown in FIG. 11, in the status in which BAN is connected, the seamless application processing unit (11) transmits a disconnect request to the mobile node (13) in response to a RAN disconnection request from the SIP client (12). The mobile node (13) requests Unregistration to the home agent (21) and deletes registration to the home agent server (20).

When no BAN is connected, the above processing is executed when the seamless application processing unit (11) is ended.

In addition to the above functions, the seamless application processing unit (11) includes a status obtaining function for obtaining the status of its terminal to a BAS server (22) at intervals set to the BAS server (31). That is, the seamless application processing unit (11) requests the GPS receiver (17) to obtain position information at the set intervals and obtains the position information of latitude and longitude. When the terminal shifts a distance larger than a threshold value from a previous position, the seamless application processing unit (11) transmits the ID of the terminal, the latitude, the longitude, and a profile in use are transmitted to the BAS server (31), and the BAS server (31) is caused to respond the status of the position (core, out of service warning, out of service) of the profile.

With this function, when RAN is currently connected and when a profile which has high priority and satisfies a current band can be connected, RAN is switched. Otherwise, a RAN status is transmitted based on the position information.

Next, the arrangement of a wireless communication server will be explained.

The wireless communication server is composed of the home agent server (20) and the resource server (30), and the home agent server (20) is composed of the home agent processing unit (21) and the a Web server (22) acting as a proxy server. The resource server (30) stores various informations such as a terminal status table and the like, in addition to the informations of the BAS server (31) and an SIP proxy server (32) that relays signaling communication between terminals executed by SIP.

The home agent processing unit (21) sets M-cast transmission in response to Registration Update (S=1) from the mobile node (13) and cancels it in response to Registration Update (S=0) therefrom.

When an M-cast transmission function is started, an IP address of transmission object and an IP address of a transmission source are used as parameters. Thereafter, the same packet is transmitted to a different opponent.

Further, the BAS server (31) stores the ID of the wireless communication terminal, a selection preference, a status notifying cycle, the IP address of BAN, an in-use BAN, an in-use RAN, the status of the status of the M-cast, the latitude, the longitude, an update date, and the like in a storage means (33) in which the terminal status table is stored.

Further, the notified ID of the wireless communication terminal and the information of wireless network interface implemented in the wireless communication terminal are registered to a terminal configuration table stored in the storage means (33) of the resource server (30).

Figure 12:
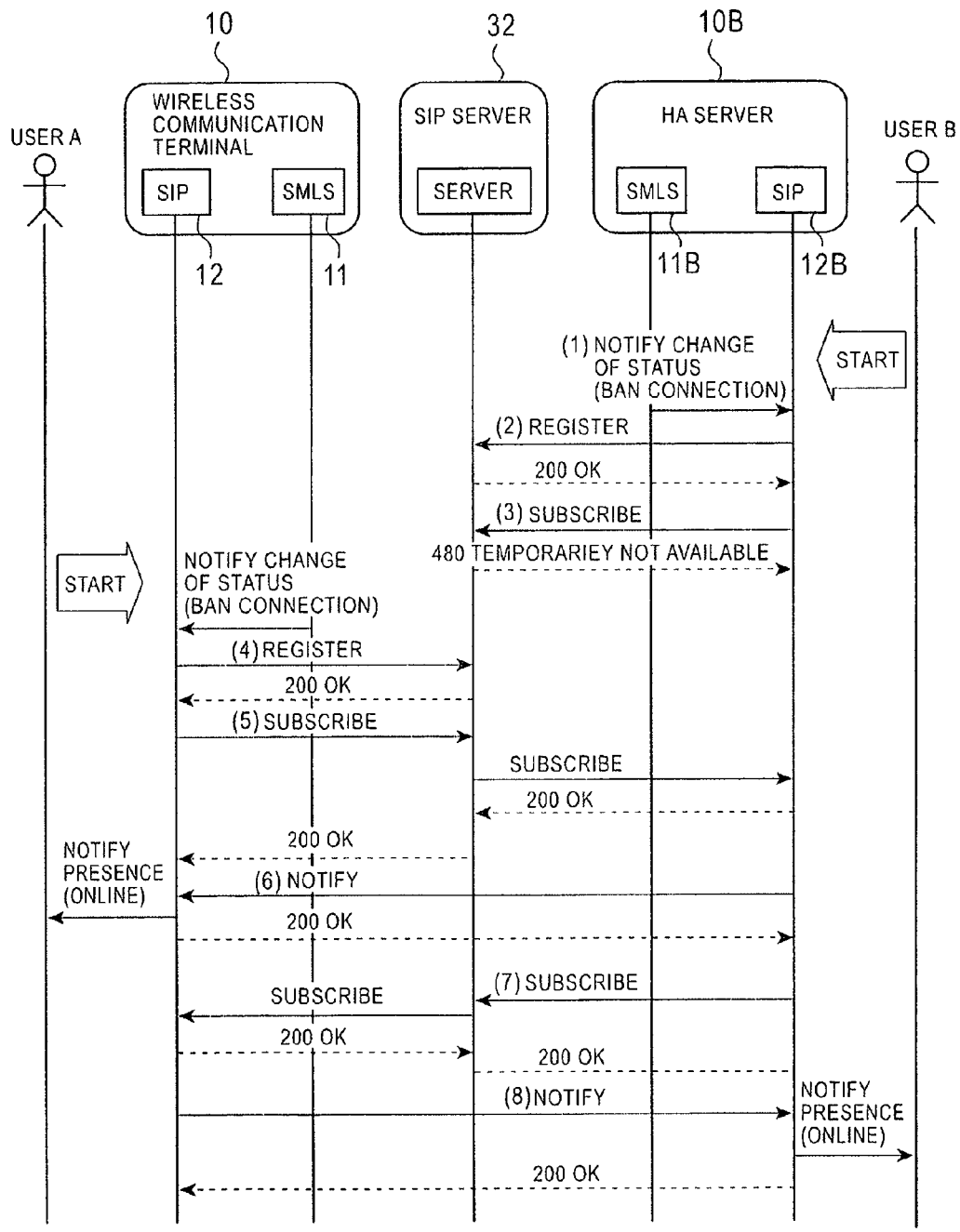
FIG. 12 shows a sequence of SIP signaling.

Next, the client processing unit (12) will be explained in detail. FIG. 12 shows a sequence of SIP signaling. In the present invention, a signaling function required by wireless communication terminal is realized by the client processing unit (12). When the SIP client processing unit (12) starts up, it is registered to the SIP proxy server (32) of the resource server (30). This is a processing for causing the SIP proxy server (32) to identify the position of SIP and to accumulate the position information thereof. After the client processing unit (12) receives a status change notification from the seamless application processing unit (11) and confirms that connection of BAN is established, it transmits a Register signal to the SIP proxy server (32).

As shown in FIG. 12, when communication is executed between the wireless communication terminal (10) used by a user A and a wireless communication terminal (10B) used by a user B, the wireless communication terminal (10) requests a SUBSCRIBE request signal (presence) to the SIP proxy server (32) to inquire the status and the communication status of other registered wireless communication terminal (for example, 10B). That is, the SUBSCRIBE signal is transmitted to all the wireless communication terminals by transmitting it to the SIP proxy server (32) when the client processing unit (12) starts up initially. Thereafter, SUBSCRIBE is requested to all the registered terminals at a previously designated cycle. In addition to the above, when change occurs, a notification (NOTIFY) can be received.

In contrast, the wireless communication terminal (10B) that receives a SUBSCRIBE request from the SIP proxy server (32) directly notifies the wireless communication terminal (10) as a source of request of current presence information. That is, a NOTIFY signal is transmitted on peer to peer. Further, when the presence information changes, the NOTIFY signal is transmitted.

The SIP signaling between terminals will be explained in detail using the sequence of FIG. 12 as an example. First, a seamless application processing unit (11B) of the terminal B (10B) executes BAN connection in response to the start up of the user B, and a result of the BAN connection is notified to a client processing unit (12B). After the client processing unit (12B) confirms the BAN connection, it executes registration (sign in) to the SIP proxy server (32) and receives a normal response.

When other users are not registered at the time the SUBSCRIBE request signal to the respective registered wireless communication terminals is transmitted to the SIP proxy server (32), error is returned.

Thereafter, when the user A notifies the client processing unit (12) of that the seamless application processing unit (11) is started up and BAN is connected, the client processing unit (12) transmits a registration signal and a SUBSCRIBE request signal to the SIP proxy server (32). Since the SUBSCRIBE request signal at the time reaches the wireless communication terminal (10B), a NOTIFY signal is transmitted from the terminal (10B) to the wireless communication terminal (10) based on the pier-to-pier basis.

Further, the wireless communication terminal (10B) recognizes that the terminal from which it received error last time starts up by receiving the SUBSCRIBE request signal therefrom and transmits the SUBSCRIBE request signal again. The wireless communication terminal (10) transmits a NOTIFY signal to the wireless communication terminal (10B) on the peer to peer, thereby communication is established therebetween.

Figure 13:
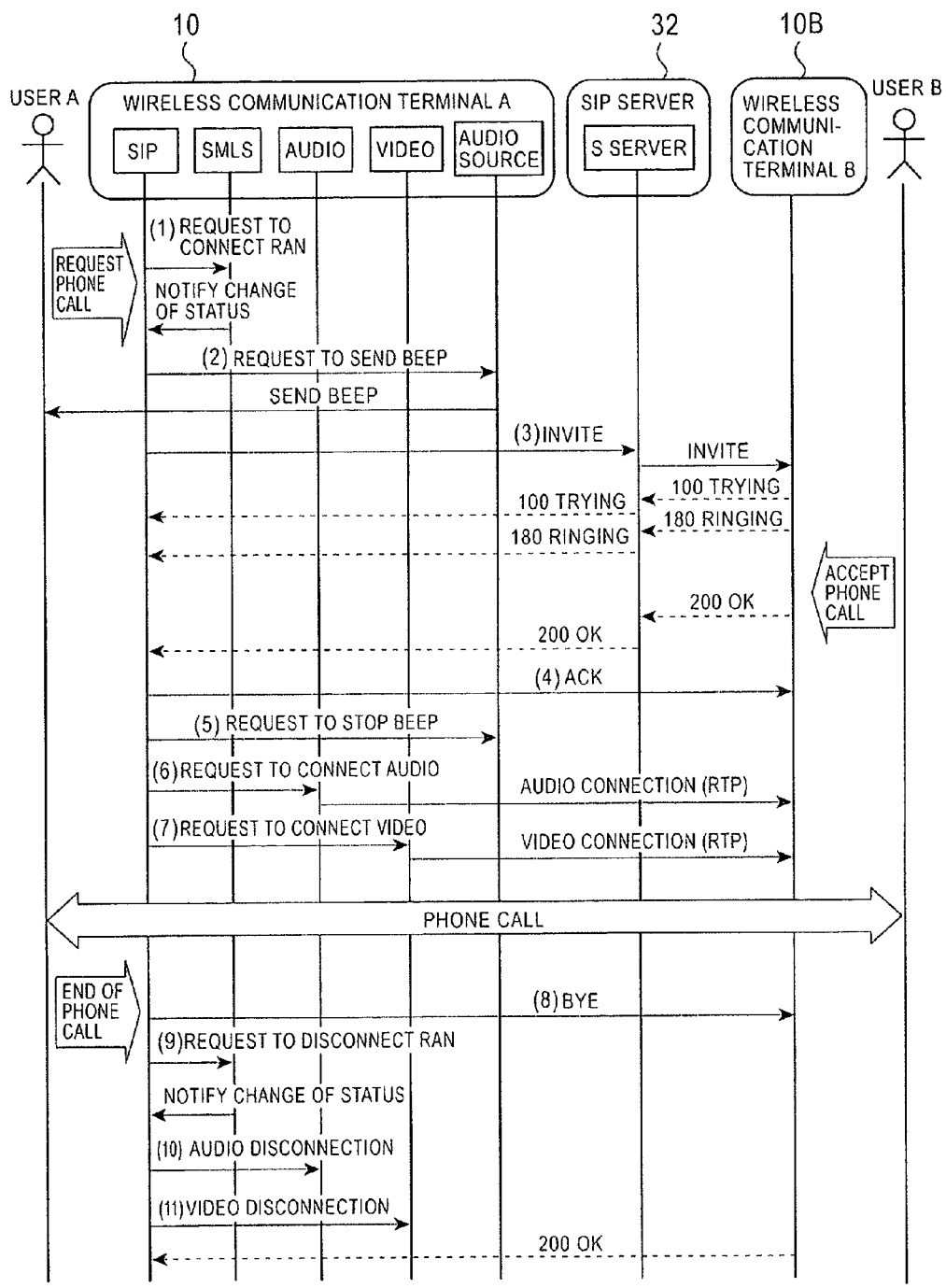
FIG. 13 shows a sequence for executing audio/video communication between wireless communication terminals.

Next, FIG. 13 shows a sequence for executing audio/video phone call between wireless communication terminals. That is, when a request for phone call is issued from the user A, the client processing unit (12) requests the seamless application processing unit (11) to connect RAN. When RAN is not connected, the seamless application processing unit (11) newly executes connection processing. A method of connecting RAN at the time is the same as that described above. On receiving RAN connecting status change notification, a beep transmission request is transmitted to an audio source (51) disposed to the wireless communication terminal (10). Beep is output from the audio source (51), and the user A can hear it.

At the same time, the client processing unit (12) transmits an INVITE signal to the SIP proxy server (32) to request connection to the wireless communication terminal (10B), and the INVITE signal is relayed and reaches the wireless communication terminal (10B). The wireless communication terminal (10B) first returns a tentative response to reception (100 Trying) and subsequently returns a response while calling (180 Ringing) that means calling is being executed. Then, when the user B accepts a phone call, it issues a success response (200 OK) to the request, and these responses reach the wireless communication terminal (10) through the SIP proxy server (32).

On receiving the success response, the client processing unit (12) transmits an ACK signal that confirms reception of the success response to the wireless communication terminal (10B) on the peer to peer and transmits a beep stop request to the audio source (51).

Then, an audio connection request and a video connection request are transmitted from the client processing unit (12) to the audio application processing unit (50) and the video application processing unit (60), respectively. The respective applications (50), (60) establish connection of audio and video data communications through RAN using RTP (Real-Time Transport Protocol).

Then, when, for example, the user A instructs that the phone call is to be finished, a BYE request signal is transmitted from the client processing unit (12) to the wireless communication terminal (10B) through BAN on the peer to peer. In response to the BYE request signal, a RAN disconnection request is transmitted to the seamless application processing unit (11), and an audio disconnection request and a video disconnection request are transmitted to the audio application processing unit (50) and the video application processing unit (60), respectively.

The opponent wireless communication terminal (10B) issues a response of success (200 OK) to the request.

Figure 14:
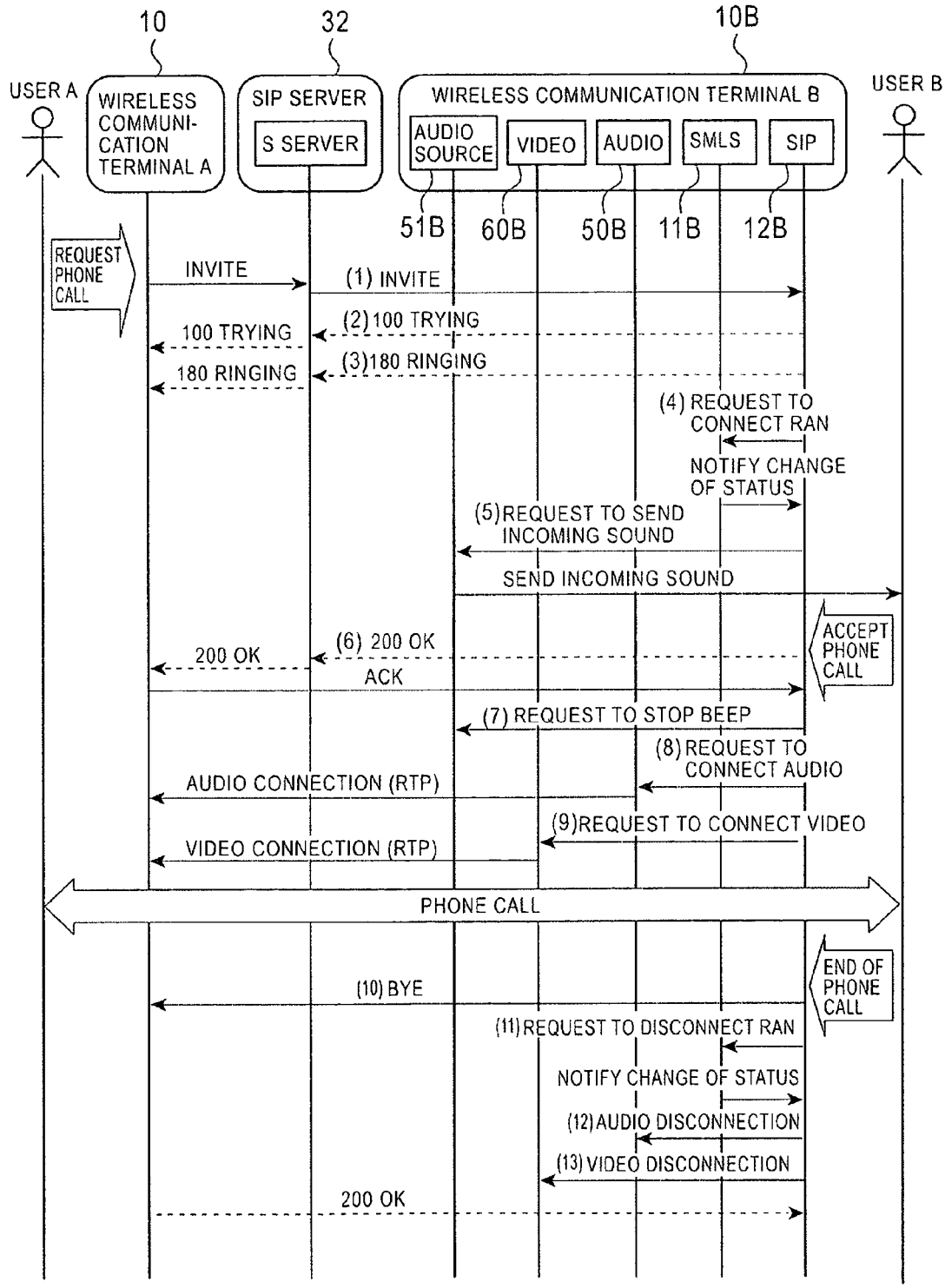
FIG. 14 shows the above sequence on a destination side.

The above mentioned is the sequence for requesting a phone call that is, the sequence of the terminal on an outgoing call side. Next, a sequence on an incoming call shown in FIG. 14 side will be explained in detail. After the wireless communication terminal (10B) returns the response while calling (180 Ringing) to the signal from the wireless communication terminal (10) shown in the sequence of the outgoing call, the client processing unit (12B) requests to the seamless application processing unit (11B) to connect RAN. When the client processing unit (12B) receives a status change notification indicating that connection is succeeded, it requests the audio source (51B) to output incoming sound. The incoming sound is output from the audio source (51B), thereby the user B can be aware of incoming call.

When the user B instructs to accept the phone call, it transmits a success response (200 OK).

When the wireless communication terminal (10B) receives an ACK signal from the wireless communication terminal (10) on the peer to peer, the wireless communication terminal (10B) transmits a beep stop request to the audio source (51B) to stop the beep. Further, an audio connection request is transmitted from the client processing unit (12B) to the audio application processing unit (50B), and a video connection request is transmitted therefrom to the video application processing unit (60B), thereby connection is established from the respective applications (50B), (60B) to the respective applications (50), (60) of the wireless communication terminal (10) by RTP.

When the user B instructs to finish the phone call at the time it is to be finished, the client processing unit (12) transmits a BYE request signal to the wireless communication terminal (10) through BAN on the peer to peer. In response to the signal, the wireless communication terminal (10B) transmits a RAN disconnection request to the seamless application processing unit (11B), an audio disconnection request to the audio application processing unit (50B), and a video disconnection request to the video application processing unit (60B), respectively. The opponent wireless communication terminal (10) issues a response of success (200 OK) to the request.

Figure 15:
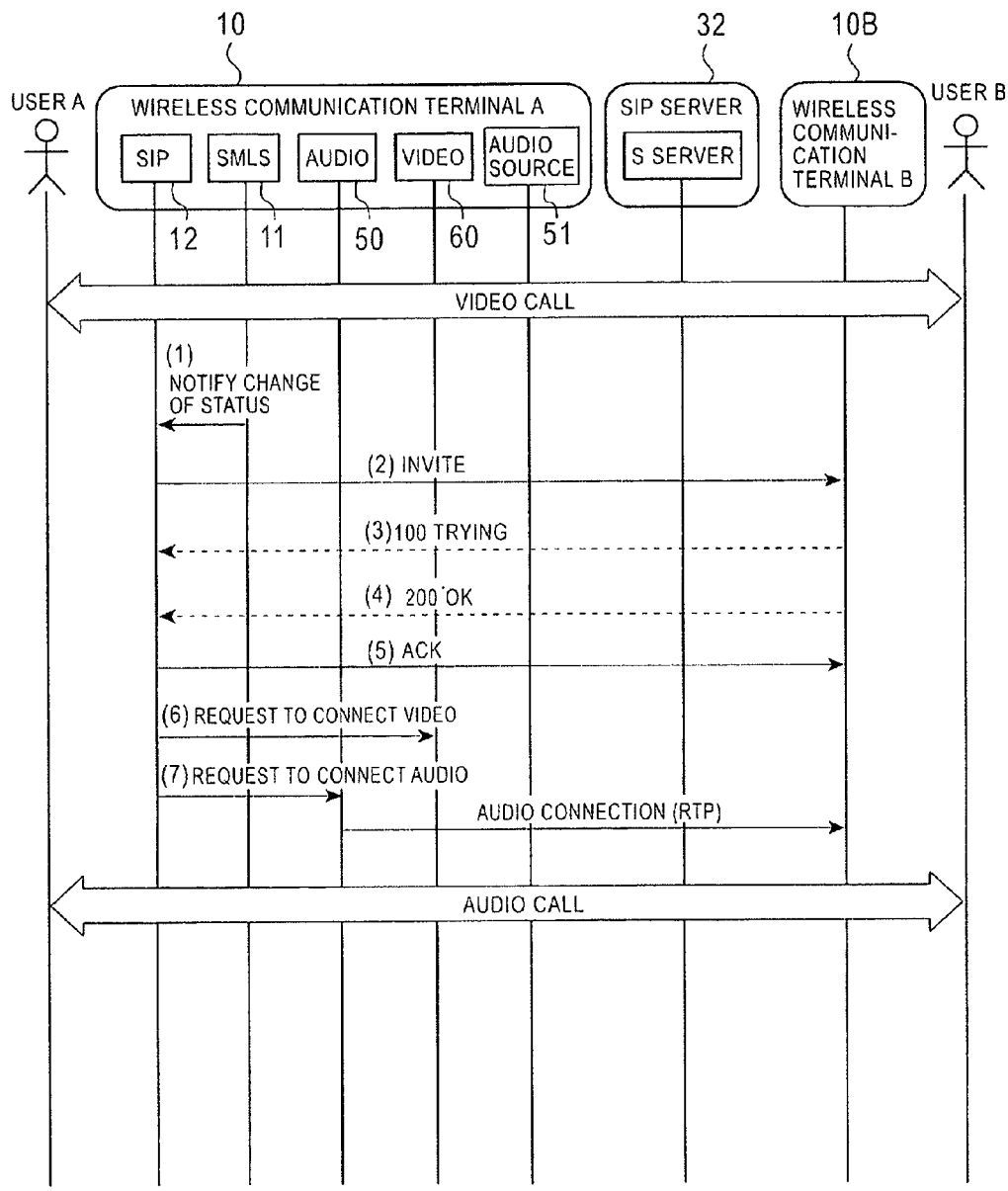
FIG. 15 shows a sequence when video call is changed to audio call.

Further, in the present invention, it is possible, after a phone call is established, to change a media application, for example, from an audio call only to a video call and from a video call to an audio call only. For this purpose, since it is necessary to reestablish connection, a request (re-INVITE) is transmitted using a new RTP payload format. FIG. 15 shows a sequence that is used when a video call is changed to an audio call.

When an available band is changed by the automatic switching of RAN and the switching of RAN executed by the user, the seamless application processing unit (11) selects a start-possible media application based on a predetermined criterion. Then, when the client processing unit (12) receives a status change notification, the client processing unit (12) transmits a request signal (re-INVITE) to the wireless communication terminal (10B) to reestablish connection between terminals on the peer to peer. After the opponent wireless communication terminal (10B) issues a response of a tentative reception response (100 Trying), it returns a request success response (200 OK).

The wireless communication terminal (10) transmits an ACK signal for confirming reception of a final response as well as instructs the video application processing unit (60) to finish video communication, and the video application processing unit (60) disconnects connection.

At the same time, the wireless communication terminal (10) instructs the audio application processing unit (50) to connect to the video application processing unit (60B) of the wireless communication terminal (10B) by RTP, thereby audio data communications is established.

The video call can be continuously changed to the audio call by the above sequence.

Further, the present invention has a function for transferring a phone call among the three wireless communication terminals (10), (10B), (10C).

At the time, the seamless application processing unit (11) has a function for instructing to establish connection to the terminal (10C) used by a user C while the wireless communication terminal (10B) is busy.

FIG. 16 shows a sequence of a call transfer function.

The wireless communication terminal (10) transmits a REFER request to the wireless communication terminal (10B) in response to a call transfer request from the user A on the peer to peer. The terminal B (10B) transmits INVITE signal to the wireless communication terminal C (10C) through the SIP proxy server (32) by BAN. The client processing unit of the wireless communication terminal C returns a tentative reception response (100 Trying) and a response while calling (180 Ringing) likewise the above-mentioned. Further, when the user C instructs to accept a phone call, a success response (200 OK) reaches the terminal B (10B). The terminal B transmits the success response as a NOTIFY signal, thereby the terminal (10) receives a response of the terminal C (10C).

The terminal B (10B) further transmits an ACK signal to the terminal C, thereby audio communication and video communication are established likewise the above connection procedure.

The wireless communication terminal (10) transmits a BYE signal to the wireless communication terminal (10B) to thereby finish connection. Transfer processing is executed between the terminal B (10B) and the terminal C (10C) as described above.

As shown in FIG. 1, it is also possible to provide the wireless communication terminals with an audio storage terminal (70) that stores an audio message. When a user is absent, the audio storage terminal (70) records and stores an audio message in place of the wireless communication terminal (10). That is, a user transmits an INVITE signal from the client processing unit (12) of the wireless communication terminal (10) to the SIP proxy server (32) to establish connection to an audio message application processing unit (71) of the audio storage terminal (70). After a tentative reception response, a response while calling, and an ACK signal are received from the audio message application processing unit (71), the audio message application processing unit (71) instructs an audio application processing unit (72) to record the audio message which is stored as an audio message file (73). An audio data communications executed in recording is the RTP communication. On the completion of the audio recording, the wireless communication terminal (10) transmits a BYE signal to the audio storage terminal (70) on the peer to peer, and the audio storage terminal (70) executes processing such as disconnection of RAN, disconnection of audio communication, and the like.

As described above, according to the wireless communications system of the present invention, since the media application such as the audio communication and the video communication is controlled by the SIP signaling communication, switching can be automatically executed depending on a band to be use and in response to an instruction from a user.

The invention claimed is:

1. A wireless communications system which uses at least two kinds of wireless communication networks, enables to simultaneously connect to a basic access network for executing signaling communication in which communication is controlled so as to be continuously switched and to a wireless access network for executing data communications other than the signaling communication and comprises wireless communication terminals and a wireless communication server, characterized in that:

each of the wireless communication terminals comprises a seamless application processing unit for executing connection processing to the basic access network and connection/disconnection processing to and from the wireless access network, an audio application processing unit for transmitting and receiving audio data though the wireless access network, a video application processing unit for transmitting and receiving video data through the wireless access network, a client processing unit having a client function in the signaling communication for controlling the audio application and the video application, a multicast communication node application processing unit for setting multicast reception using at least the two kinds of the wireless communication networks, respective network devices corresponding to the respective wireless communication networks, and position obtaining means of the wireless communication terminals; and the wireless communication server comprises a home agent application processing unit for setting a multicast transmission using at least the two kinds of the wireless communication networks, a basic access network server processing unit for notifying, when the wireless communication networks are continuously switched, the wireless communication terminals of a wireless communication network acting as a switching candidate and managing the signaling communication for communicating the status of the respective wireless communication terminals therebetween and managing the registration/update processing of the respective wireless communication terminals, a relay server processing unit for managing relay of the signaling communication for communicating the status of the respective wireless communication terminals therebetween, a terminal status table for managing the status of the respective wireless communication terminals, and a terminal configuration table for managing the wireless communication networks implemented in the wireless communication terminals, wherein the seamless application processing unit obtains position information from the position obtaining means and notifies the basic access network server processing unit of the position information, and the basic access network server processing unit registers the position information to the terminal status table.

2. A wireless communications system according to claim 1, wherein, in the wireless communication terminals, the seamless application processing unit monitors the connection status of the respective wireless communication networks at a predetermined cycle based on a list of the wireless communication networks previously recorded to the wireless communication terminals.

3. The wireless communications system according to claim 1 or 2, characterized in that:

the wireless communication server comprises two servers of, a home agent server comprising the home agent application processing unit and a resource server comprising the basic access network server processing unit, the basic access network server processing unit, the relay server processing unit, the terminal status table, and the terminal configuration table, wherein, the home agent server is provided with a proxy server processing unit for relaying communication between the seamless application processing unit and the basic access network server processing unit.

4. A wireless communications system according to claim 1, wherein:

the wireless communication terminals are registered to the relay server processing unit together with the position information thereof; and each of respective client processing units transmits a subscribe request signal to an opponent client processing unit between two optional registered wireless communication terminals and the client processing unit which receives the subscribe request signal directly responds its information to an opponent and establishes connection between the wireless communication terminals.

5. A wireless communications system according to claim 4, wherein the audio application processing unit and the video application processing unit establish direct connection to the audio application processing unit and the video application processing unit of the opponent wireless communication terminal.

6. A wireless communications system according to claim 5, characterized in that communication between audio application processing units is continuously switched to communication between video application processing units by signaling communication between respective client processing units in response to the status change notification from the seamless application processing unit of the wireless communication terminal.

* * * * *